Aug. 24, 1926.
B. A. SMITH
1,597,252
IRREVERSIBLE STEERING GEAR ATTACHMENT FOR AUTOMOBILES
Filed March 4, 1922   3 Sheets-Sheet 1
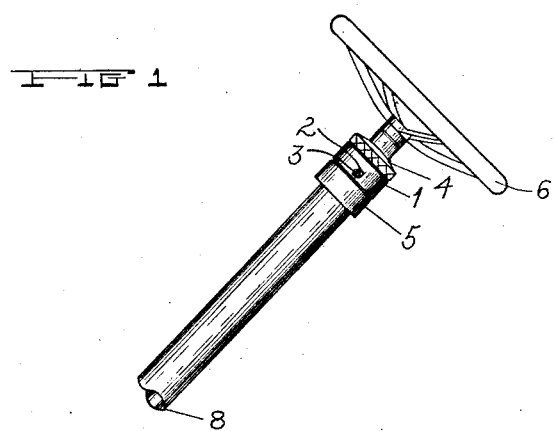
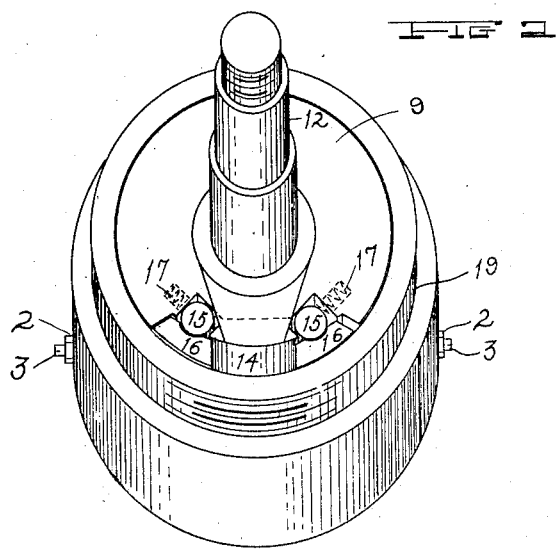
INVENTOR.
Bryce A. Smith Aug. 24, 1926.  
B. A. SMITH  
1,597,252  
IRREVERSIBLE STEERING GEAR ATTACHMENT FOR AUTOMOBILES  
Filed March 4, 1922   3 Sheets-Sheet 2

INVENTOR.  
Bryce A. Smith

Aug. 24, 1926.
B. A. SMITH
1,597,252
IRREVERSIBLE STEERING GEAR ATTACHMENT FOR AUTOMOBILES
Filed March 4, 1922      3 Sheets-Sheet 3
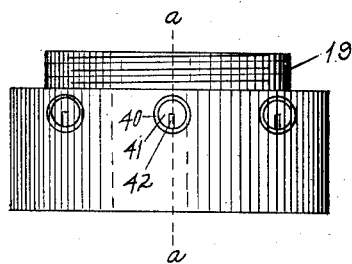
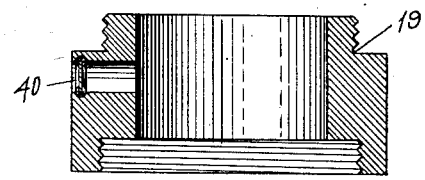
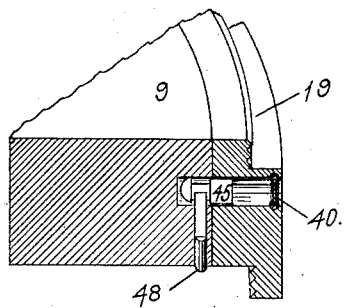
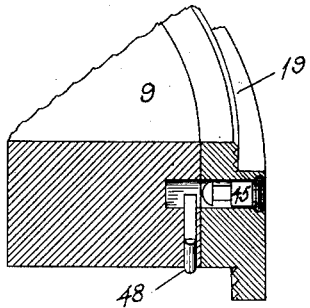
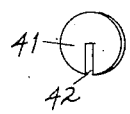
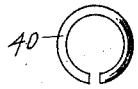
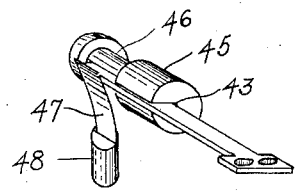
INVENTOR.
Bryce A. Smith Patented Aug. 24, 1926.

1,597,252

UNITED STATES PATENT OFFICE.

BRYCE A. SMITH, OF GLENDALE, CALIFORNIA.

IRREVERSIBLE STEERING-GEAR ATTACHMENT FOR AUTOMOBILES.

Application filed March 4, 1922. Serial No. 541,251.

This invention relates to new and useful improvements in irreversible steering gear attachments for motor cars, and consists of a simple and effective device which may be detachably attached to the usual steering post used by automobiles.

The invention consists further in the provision of a locking device comprising various details of construction, combinations and arrangements of parts, which will be hereinafter fully described, shown in the accompanying drawings, and then specifically defined in the appended claims.

My invention is illustrated in the accompanying drawings which, with the letters of reference marked thereon, form a part of this specification and in which:—

Figure 1 is a sectional elevation of a steering post and steering wheel, broken off at the bottom end at 8 showing my device attached.

Figure 2 is a top plan view of my braking and locking device.

Figure 10 is the outside casing of my device, showing the keyholes for locking and unlocking same.

Figure 11 is the same as Figure 10, showing a cross section at a—a Figure 10.

Figure 12 is a detail view of my locking device, showing a quarter section of the core and rim of said device locked.

Figure 13 is a detail view of my locking device, showing a quarter section of my device with the core and rim unlocked.

Figure 14 is a detail view of the movable filler and keyhole for my locking device.

Figure 15 is a detail view of the rim of the movable filler, Figure 14, for holding the same in position.

Figure 16 is the same rim as in Figure 15, cut in two in the center.

Figure 17 is a plan view of the manner of operation of my locking device.

Figure 3:
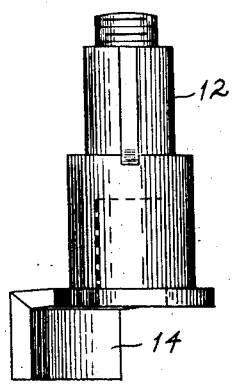
Figure 3 is a perspective view of the release for the lock, actuated by the steering wheel.

By the provisions of a locking device, made in accordance with my invention, it will be noted that the same may be easily and quickly applied to the ordinary steering gear and post commonly used on automobiles.

Figure 1 at numeral 1 shows my device completely attached to a steering post, the cap or cover 4, same figure, being ordinarily used on the gear-casing 5. To attach my device, remove the steering wheel 6 and the cap 4, and screw my device 1 on the gear-casing 5, then attach the cap 4 to my device 1 and replace the steering wheel 6, making it immediately ready for action. Then by turning wheel 6, which is attached at 12, Figure 2, and locked thereon, Figure 1, you receive a sliding action of the core 9, as the lug 14 would move against the roller lock 15, causing the release of the locking lug 16, thereby dragging the locking lug and roller lock 15 and 16 on the opposite side, but should a turning movement be forced on the shaft 35, Figure 9, at 38 same figure, the locking lugs and rollers, Figure 2, would not allow the turning of said shaft, thus locking the steering gear of an automobile when force is applied from the lower side of my device, allowing it at all times to be free and movable from the upper side.

Figure 7:
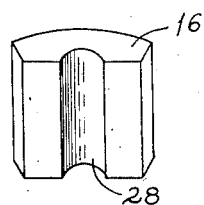
Figure 7 is a detail view of the movable clutch, operated by the roller lock, Figure 4.

The locking lug, Figures 2 and 7, is the most important part of my device, allowing the roller 15 a firm bearing at 28, Figure 7, and the shoe also a firm bearing on the rim 19, Figure 2, thus it will be seen that a severe turning movement from the lower shaft of my device will immediately lock said shaft going in either direction by the action of the rollers 15 carrying the locking shoes 16, causing a binding movement of the same and core 9 to the rim 19, Figure 2.

Figure 4:
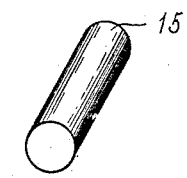
Figure 4 is a detail view of the roller lock.
Figure 5:
Figure 5 is a detail view of the spring controlling the roller lock, Figure 4.
Figure 6:
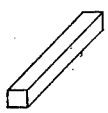
Figure 6 is a detail view of the locking pin used in locking the friction clutch, Figure 8, to the driving shaft, Figure 9.
Figure 8:
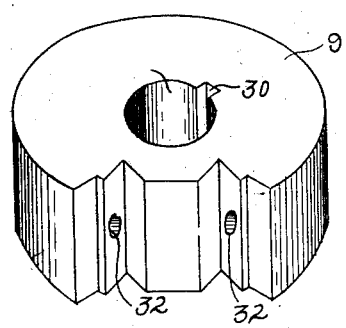
Figure 8 is a detail view of the core of my device.
Figure 9:
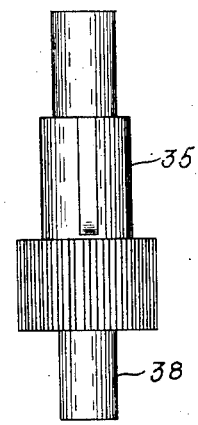
Figure 9 is a detail view of the driving shaft used in Figure 8.

In assembling my device, I take the shaft, Figure 9, insert it from the under side of Figure 8 through the hole 31, inserting the locking key in the key slot 30, Figure 8, then insert the spring, Figure 5, in the hole 32, Figure 8, upon which place the roller, Figure 4, and thereon the shoe, Figure 7, depressing the same and forcing them in casing 19.

Figure 3 is the driving post attachment for my device. The driving wheel 6, Figure 1, being attached to the steering post at 12, Figure 3, it will be noted, when turned, that the lip 14, Figure 3, will carry with it the core 9, the roller lock 15 and the locking lugs 16. By the action of the lip 14 striking the roller 15, depressing the spring 17, dragging the roller lock 15 and the locking lug 16 on the opposite side.

My device is secured to the steering post of an automobile by two bolts 3, Figures 1 and 2, and a locknut 2, same figure.

Figure 10, shows three keyholes for locking my device in three positions. By turning the core 9, Figure 2, which has a hole bored in the same, shown broken off in Figures 12 and 13, to correspond with the hole in the casing 19, and inserting a key in the slot 42, I can push the lug 45 against the spring 47, making it snap in the depression 46, thereby locking the core 9 into the shell 19.

Having described my invention what I claim is:—

1. In an irreversible steering clutch a casing having an internal annular friction surface, an oscillatable core co-axial thereof provided with surfaces extending tangential to a circle described around the center of oscillation of the core, and a plurality of brake shoe members each presenting an elongated, rounded edge of minimum area of contact to a corresponding tangential surface, and further presenting to said annular brake surface, a corresponding and accurately conforming surface of maximum area of contact therewith.

2. In an irreversible steering clutch a casing having an internal annular friction surface, an oscillatable core co-axial therein having surfaces tangential to a circle described around the center of oscillation of said core, and a brake shoe between a tangential surface and the corresponding part of the casing; said brake shoe having its outer surface conforming to the friction surface of the casing so as to have maximum friction therewith, said brake shoe further provided wth an inner rounded surface adjacent the corresponding tangential surface to offer minimum friction thereto when forced into contact therewith.

3. In an irreversible steering clutch a casing having an internal annular friction surface, an oscillatable core co-axial thereof provided with surfaces extending tangential to a circle described around the center of oscillation of the core, and a plurality of brake shoe members each presenting an elongated rounded edge of minimum area of contact to a corresponding tangential surface, and further presenting to said annular brake surface, a corresponding and arcuately conforming surface of maximum area of contact therewith; each tangential surface of the core terminating at an abutment surface of the core extending substantially radially with regard to the center of oscillation, and movable means operable to move said core; the brake shoe being interposed directly between said means and an abutment surface so that said means acts on said core only through said brake shoe and only after having moved the brake shoe in the direction in which the tangential surface converges toward the said described circle.

4. In an irreversible steering clutch a casing having an internal annular friction surface, an oscillatable core co-axial therein having surfaces tangential to a circle described around the center of oscillation of said core, and a brake shoe between a tangential surface and the corresponding part of the casing; said brake shoe having its outer surface conforming to the friction surface of the casing so as to have maximum friction therewith, said brake shoe further provided with an inner rounded surface adjacent the corresponding tangential surface to offer minimum friction thereto when forced into contact therewith; each tangential surface of the core terminating at an abutment surface of the core extending substantially radially with regard to the center of oscillation, and movable means operable to move said core; the brake shoe being interposed directly between said means and an abutment surface so that said means acts on said core only through said brake shoe and only after having moved the brake shoe in the direction in which the tangential surface converges toward the said described circle.

5. In an irreversible steering clutch an oscillatable core having portions of its perimeter removed to provide opposed wedge shape spaces each bounded by a surface tangential to a circle described around the center of oscillation of the core and by an abutment surface intersecting the tangential surface at an appreciable angle, a fixed annular wall surrounding said core whereby one wedge shape space decreases in effective width in one direction of rotation while the other space decreases in effective width in the opposite direction of rotation, and a brake shoe in each space, an outer surface of the brake shoe conforming to the annular wall so as to present maximum area of frictional contact therewith, each brake shoe member presenting only a rounded surface to the corresponding tangential surface minimum frictional contact therewith, and means operable to move said core, said means being effective on core only by forcing a brake shoe against a corresponding abutment surface.

6. In a clutch having an annular brake surface, a co-axial core having tangential surfaces co-acting with the annular brake surface to provide wedging spaces therebetween, a cylindrical member in each space adapted to abut the corresponding tangential surface with its arcuate surface, and a segmental brake shoe between each cylindrical member and a corresponding part of the annular surface; the outer surface of the brake shoe member conforming throughout its area to the brake surface; the cylindrical member being partially imbedded in said segmental brake shoe.

7. The combination with a clutch having a core provided with wedging surfaces, and an annular brake member encompassing said core, and a cylindrical member for each wedging surface; of a segmental brake shoe for each cylindrical member having an outer braking surface conforming in curvature to the corresponding part of the annular brake member for maximum area of frictional contact therewith; the opposite side of the brake shoe having a concave groove into which the corresponding roller is fitted.

Signed at Los Angeles, California, this 27th day of February, 1922.

BRYCE A. SMITH.